United States Patent [19]

Tausheck

[11] Patent Number: 5,404,549
[45] Date of Patent: Apr. 4, 1995

[54] METHOD FOR EFFICIENT ACCESS OF DATA STORED IN A NEXUS TABLE USING QUEUE TAG INDEXES IN A TABLE PORTION

[75] Inventor: Eric G. Tausheck, Citrus Heights, Calif.

[73] Assignee: Hewlett-Packard Company, Palo Alto, Calif.

[21] Appl. No.: 727,759

[22] Filed: Jul. 10, 1991

[51] Int. Cl.$^6$ ............................................. G06F 12/00
[52] U.S. Cl. .................................. 395/800; 395/425; 364/DIG. 1; 364/252.6; 364/254; 364/254.5; 364/255.2; 364/255.7
[58] Field of Search ............... 395/275, 325, 400, 425, 395/250, 800, 575

[56] References Cited

U.S. PATENT DOCUMENTS

| | | | |
|---|---|---|---|
| 4,060,849 | 11/1977 | Bienvenu et al. | |
| 4,413,317 | 11/1983 | Swenson | 395/425 |
| 4,600,990 | 7/1986 | Gershenson et al. | 395/425 |
| 4,905,184 | 2/1990 | Giridhar et al. | 395/400 |
| 4,920,478 | 4/1990 | Furuya et al. | 395/425 |
| 4,947,579 | 7/1990 | Goodlander et al. | 371/51.1 |
| 4,965,801 | 10/1990 | Dulac | 371/40.1 |
| 5,089,958 | 2/1992 | Horton et al. | 395/575 |
| 5,113,500 | 5/1992 | Talbott et al. | 395/325 |
| 5,129,072 | 7/1992 | Larner et al. | 395/425 |
| 5,170,466 | 12/1992 | Rogon et al. | 395/400 |

FOREIGN PATENT DOCUMENTS 1451516  3/1991  European Pat. Off. .

*Primary Examiner*—Alyssa H. Bowler
*Assistant Examiner*—Mehmet Geckil

[57] ABSTRACT

Entries for data transactions are stored in and accessed from a nexus table. Data transactions over a bus are identified using a first reference. Further, data transactions may be additionally identified using a second reference. When a data transaction is identified only by a first reference, an entry for the data transaction is stored in a location within a first portion of the nexus table. Entries in the first portion of the nexus table are indexed using the first reference for the data transaction. When a data transaction is identified using both a first reference and a second reference, an entry for the data transaction is stored in a location within a second portion of the nexus table. Entries in the second portion of the nexus table are indexed using the second reference number for the data transaction. The first reference is not used in indexing entries in the second portion of the nexus table.

2 Claims, 7 Drawing Sheets

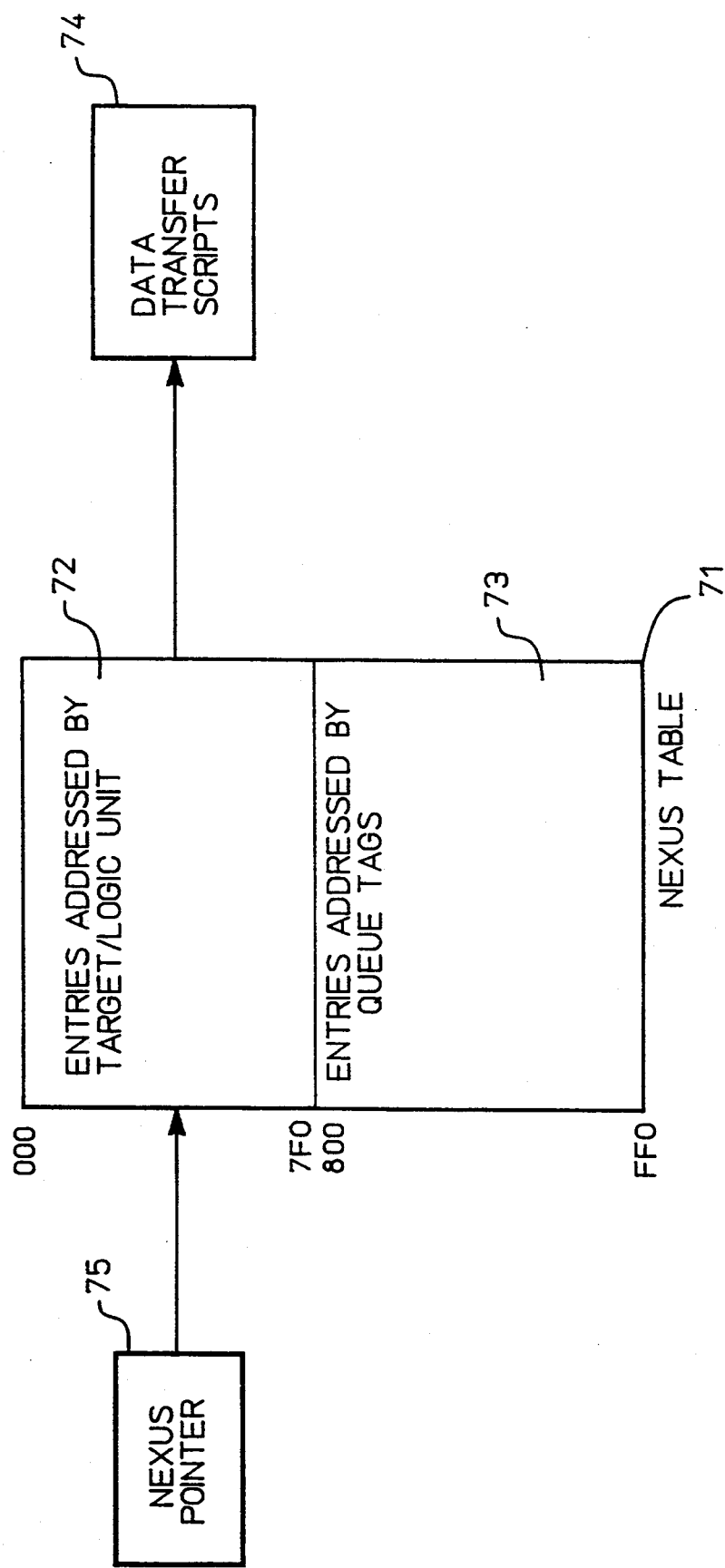

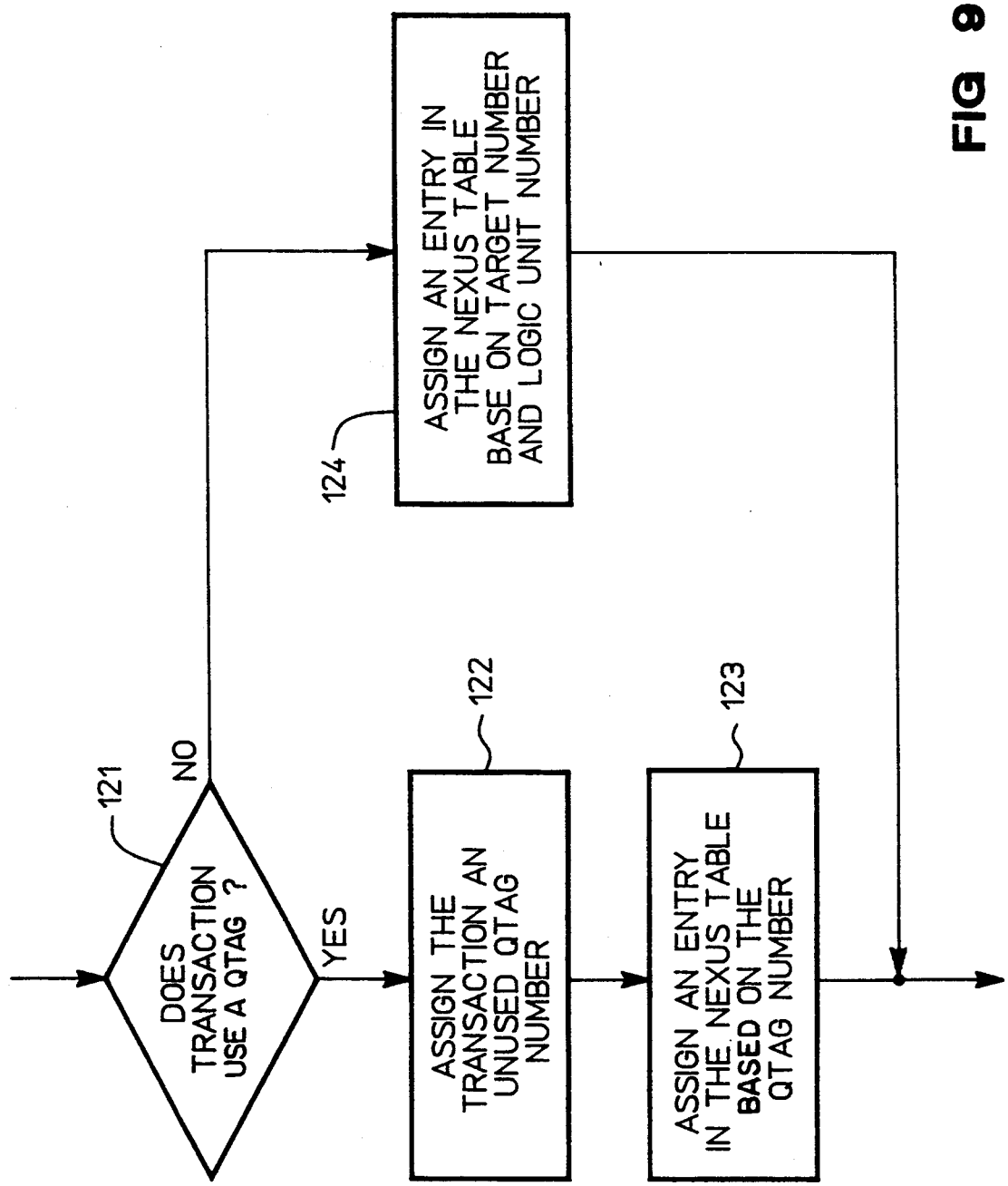

5,404,549

METHOD FOR EFFICIENT ACCESS OF DATA STORED IN A NEXUS TABLE USING QUEUE TAG INDEXES IN A TABLE PORTION

BACKGROUND

The present invention concerns the construction of a bus nexus table and a method for efficient access of the data stored therein. The invention has particular application to the construction and access of a nexus table for a SCSI bus.

For busses that operate according to the SCSI protocol, I/O data transactions are initiated and controlled by an initiator, e.g., a personal computer, which is connected to a SCSI bus. Also connected to a SCSI bus are one or more targets. A target may be, for example, a hard disk drive, a tape back-up, a scanner, etc. According to presently implemented protocols, the total number of initiators and targets connected to a single SCSI bus is limited to either eight or sixteen.

Each target may have up to eight logic units. Each of the eight logic units may be separately addressed by an initiator.

When operating in accordance with the SCSI protocol, an initiator is required to manage multiple concurrent input/output (I/O) data transactions in various stages of completion. Data transactions are identified by the initiator through the use of target numbers statically assigned to each target and logic unit numbers statically assigned to each logic unit. Additionally, for data transactions, an initiator can dynamically assign up to 256 queue tags (Q tags) per logic unit. Theoretically, in a system which includes one initiator and seven targets, this allows an initiator to manage up to 14,336 concurrent I/O data transactions. In practice the number of concurrent I/O data transactions occurring at any one time is significantly less.

In order to manage multiple concurrent I/O data transactions, an initiator needs to store a current state of each data transaction. Typically this may be done by storing entries in a nexus table for each I/O data transaction in progress. However if an entry is reserved for all possible data transactions, the table would need 14,336 entries for a system with seven targets. In a system with fifteen targets, the number of required entries would increase to 30,720. While it is possible to build and access such a nexus table, the amount of memory required makes such a large table undesirable.

SUMMARY OF THE INVENTION

In accordance with the preferred embodiment of the present invention, a method is presented for storing entries for data transactions in a nexus table. The nexus table, for example, stores entries for suspended data transactions over a SCSI bus. In the system, data transactions over a bus are identified using a first reference, for example, a target number and a logic unit number. Further, data transactions may be additionally identified using a second reference, for example, a queue tag number. When a data transaction is identified only by a target number and a logic unit number, an entry for the data transaction is stored in a location within a first portion of the nexus table. Entries in the first portion of the nexus table are indexed using the target number and the logic unit number for the data transaction. When a data transaction is identified using a target number, a logic unit number and a queue tag number, an entry for the data transaction is stored in a location within a second portion of the nexus table. Entries in the second portion of the nexus table are indexed using the queue tag number for the data transaction. The target number and the logic unit number are not used in indexing entries in the second portion of the nexus table.

While generally the first portion of the nexus table and the second portion of the nexus table are placed in contiguous locations in memory, it is possible to place the two table portions in separate locations in memory, in essence creating two separate tables.

BRIEF DESCRIPTION OF THE DRAWINGS

FIG. 6 shows a nexus table which contains pointers to locations within data transfer scripts and which is accessed using an index in accordance with an alternate preferred embodiment of the present invention.

FIG. 9 is a flowchart which shows how a data transaction is assigned a location in the nexus table shown in FIG. 3 or the nexus table shown in FIG. 6 in accordance with the preferred embodiment of the present invention.

DESCRIPTION OF THE PREFERRED EMBODIMENT

Figure 1:
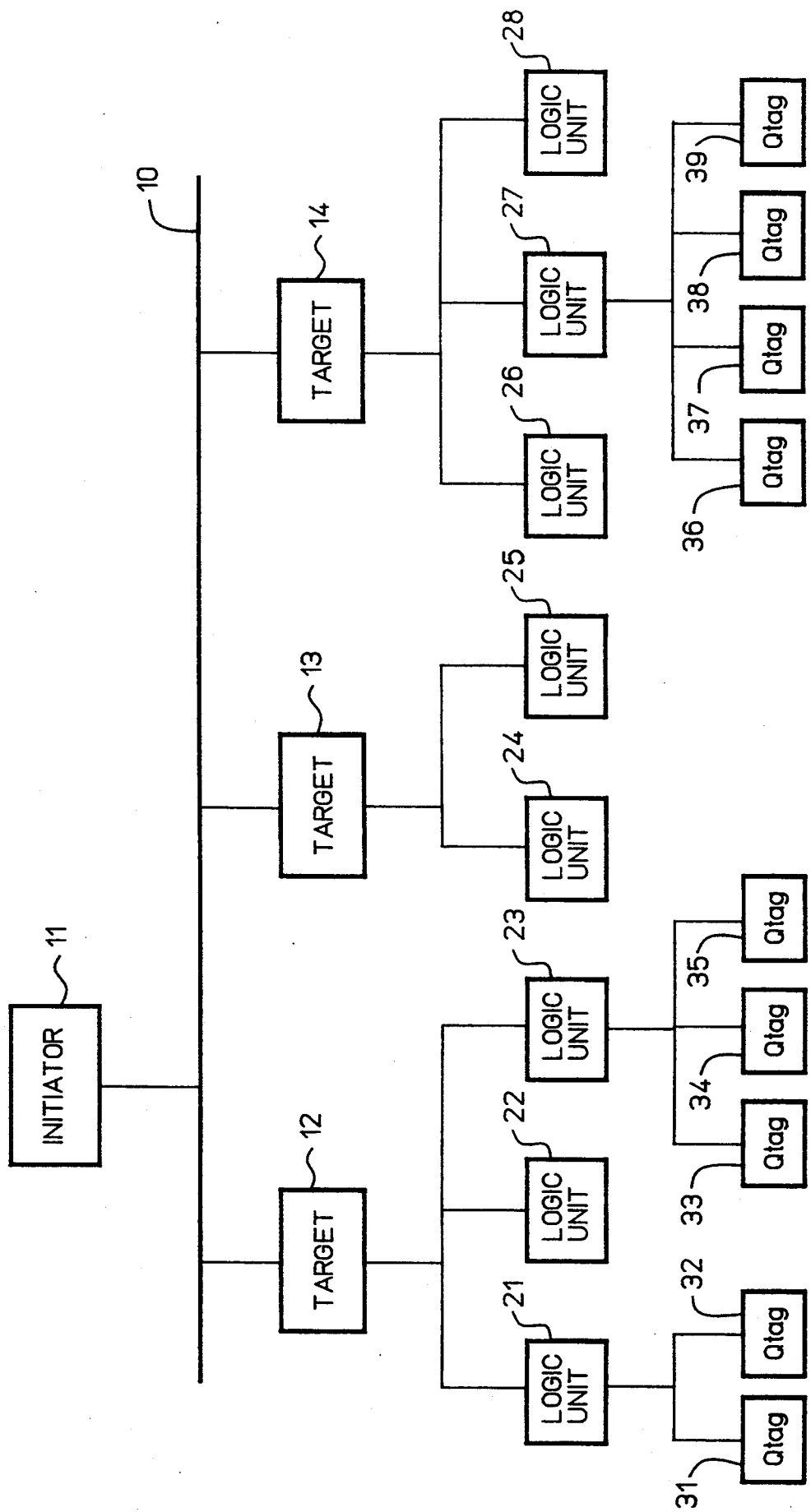
FIG. 1 shows a block diagram illustrating the potential layers of multiple concurrent I/O data transactions using the SCSI bus protocol.

FIG. 1 shows a logical block diagram of communication over a SCSI bus 10. An initiator 11 initiates data transactions with up to fifteen targets on SCSI bus 10. This assumes SCSI bus 10 conforms to a proposed SCSI-3 protocol which permits sixteen entities to be connected to a SCSI bus. The SCSI-1 and SCSI-2 protocols permit only eight entities to be connected to a SCSI bus. For example, a target 12, a target 13 and a target 14 are shown connected to SCSI bus 10. Each target includes up to eight logic units. For example, target 12 has a logic unit 21, a logic unit 22 and a logic unit 23. Target 13 has a logic unit 24 and a logic unit 25. Target 14 has a logic unit 26, a logic unit 27 and a logic unit 28. Data transactions which are initiated by initiator 11 are addressed by a target number which identifies a target, and a logic unit number which identifies a logic unit. In addition, initiator 11 may assign up to 256 queue tags per logic unit (for SCSI-2 or SCSI-3) to identify transfers in progress. For example, in FIG. 1, initiator 11 has assigned a queue tag 31 and a queue tag 32 for data transactions with logic unit 21. Similarly, initiator 11 has assigned a queue tag 33, a queue tag 34, and a queue tag 35 for data transactions with logic unit 23 with logic unit 2. Initiator 11 has assigned a queue tag 36, a queue tag 37, a queue tag 38 and a queue tag 39 for data transactions with logic unit 27.

Figure 2:
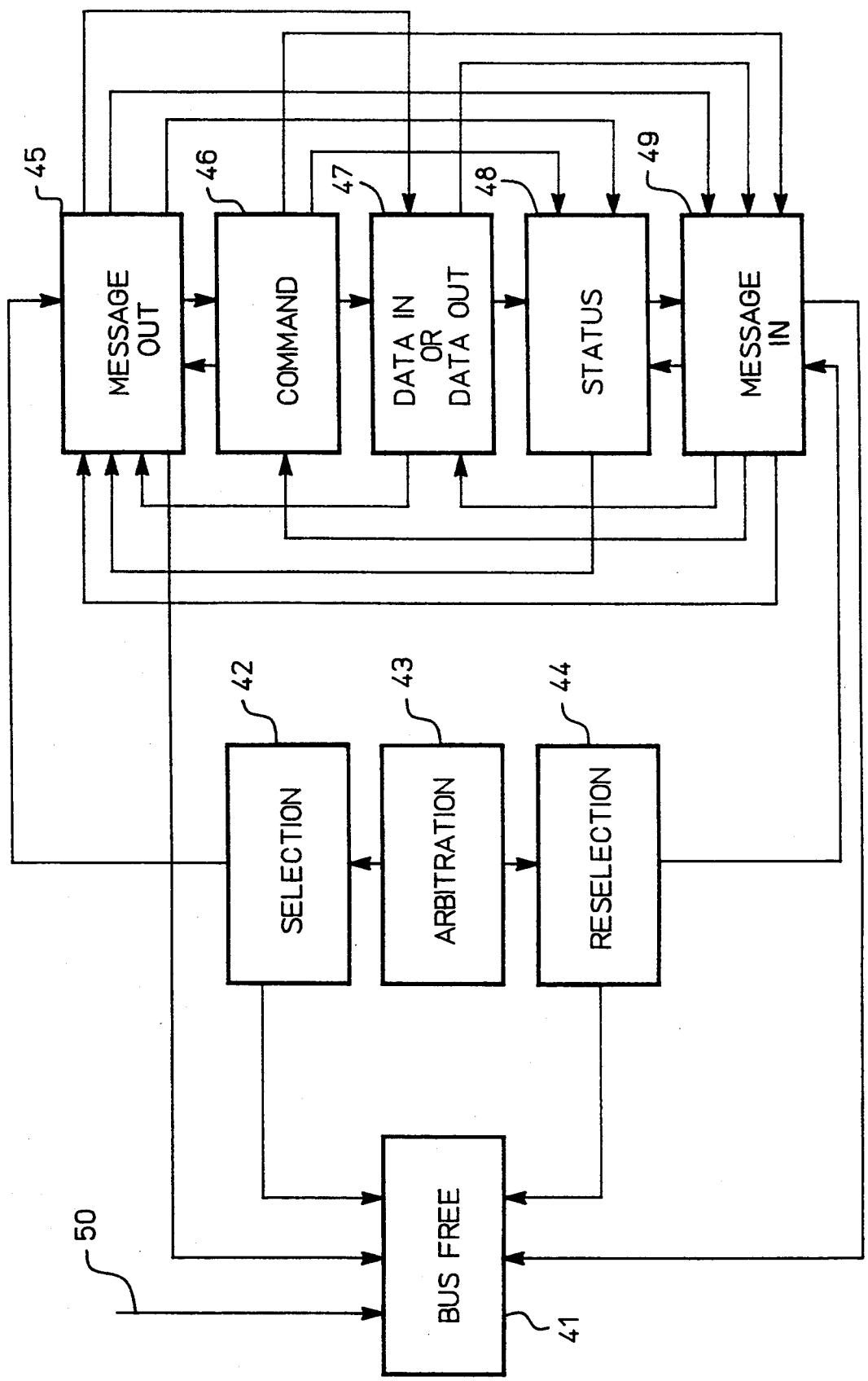
FIG. 2 is a block diagram which indicates phases in communication between an initiator and a target using the SCSI bus protocol.

FIG. 2 is a diagram which shows the interrelationship between various operating phases of initiator 11. In a bus phase 41, SCSI bus 10 is free. Once initiator 11 and/or one or more of target 12, target 13 and target 14 request access to bus 10, initiator 11 enters an arbitration phase 43. If initiator 11 wins arbitration, initiator 11 moves from arbitration phase 43 to a selection phase 42 or to a reselection phase 44. In selection phase 42, initiator 11 initiates a data transaction with one of the targets connected to SCSI bus 10. From selection phase 42, initiator 11 enters a message out phase 45. In message out phase 45, initiator 11 sends a message to the target with which initiator 11 is initiating a data transaction. In general, initiator 11 enters each phase at the target's bidding. The target, however, must go to message in phase 49 after reselection phase 44 and after status phase 48. Similarly, the target must go to message out phase 45 after selection phase 42.

In reselection phase 44, after having won arbitration, one of the targets on SCSI bus 10 requests resumption of a data transaction with initiator 11. From reselection phase 44, initiator 11 enters a message in phase 49. In message in phase 49, initiator 11 receives an IDENTIFY message from the target on SCSI bus 10 which is requesting resumption of the data transaction.

From message in phase 49, initiator 11 may enter a status phase 48, a data in or data out phase 47, a command phase 46, message out phase 45 or return to bus free phase 41. Similarly, from message out phase 45, initiator 11 may enter status phase 48, data in or data out phase 47, command phase 46, message in phase 49 or return to bus free phase 41.

In status phase 48, initiator 11 receives status information from a target on SCSI bus 10. In command phase 46, initiator constructs a command to be sent to a target of SCSI bus 10. In data in or data out phase 47, initiator 11 performs a data transaction to or from a target on SCSI bus 10. For more information on how initiator 11 functions in each of the phases see American National Standard X3T9.2/375R Revision 10d (SCSI-2) available from Global Engineering Documents, 2805 McGaw, Irvine, Calif. 92714.

Figure 3:
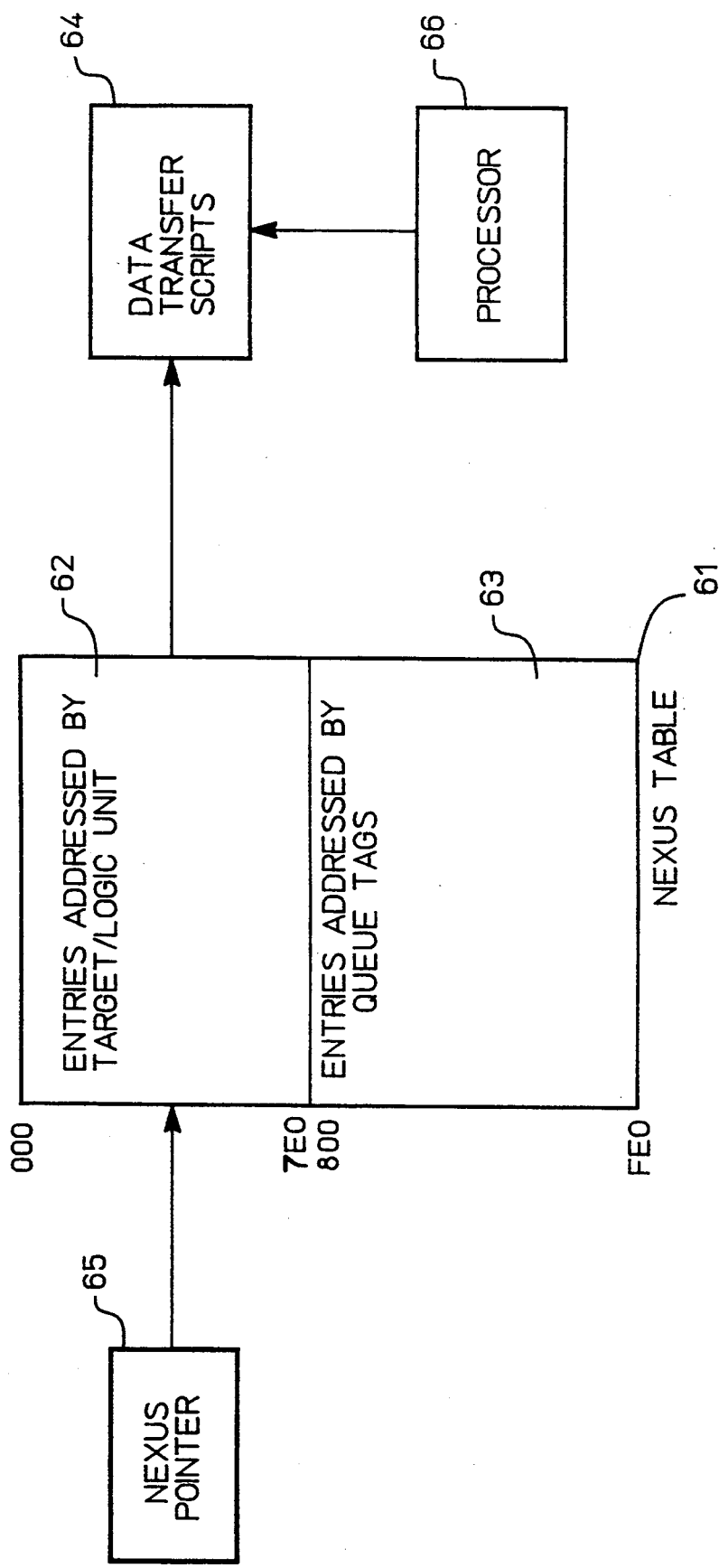
FIG. 3 shows a nexus table which contains pointers to locations within data transfer scripts and which is accessed using an index in accordance with the preferred embodiment of the present invention.

Using the SCSI protocol, initiator 11 keeps track of multiple concurrent I/O data transactions. In the preferred embodiment, initiator 11 does this by means of a nexus table. For example, FIG. 3 shows a nexus table 61 within an initiator which is connected to a SCSI bus which supports up to seven targets. Each target may have up to eight logic units and each logic unit supports up to 64 queue tags.

Data transactions which have no queue tags are identified using just a target number and a logic unit number. Entries for data transactions in progress which are addressed using just a target number and a logic unit number are stored in a first portion 62 of nexus table 61. Entries for data transactions which are identified using target numbers, logic numbers and queue tags are stored in a second portion 63 of nexus table 61.

Each entry in nexus table 61 is thirty-two bytes and includes a pointer into data transfer scripts 64. Data transfer scripts 64 includes scripted code which control data transfers between an initiator and targets on a SCSI bus. A processor 66 within initiator 11 executes data transfer scripts 64 in order to implement data transfers over bus 10.

Figure 4:
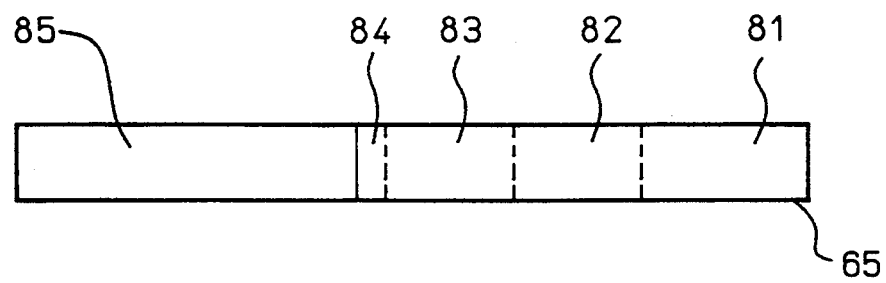
FIG. 4 and FIG. 5 show bit formats of an index used to access the nexus table shown in FIG. 3 in accordance with the preferred embodiment of the present invention.

For transfers which are suspended, initiator 11 places an entry in nexus table 61. During reselection, initiator 11, accesses nexus table 61 with an index (nexus pointer) 65 in order to continue the suspended data transfer. When there is no queue tag associated with the data transfer, FIG. 4 shows the format of nexus pointer 65. The five low order bits 81 are all set at zero. This is because each entry in table 61 includes thirty-two bytes. The next three bits 82 of nexus pointer 65 are a target number which identifies the target for the data transaction. The next three bits 83 of nexus pointer 65 are a logic unit number identifying the logic unit for the data transaction. A bit 84 of nexus pointer 65 is at zero indicating that nexus pointer 65 is addressing an entry in portion 62 of nexus table 61. Bits 85 of nexus pointer 65 are set to point to the location of nexus table 61 in memory within initiator 11.

Figure 5:
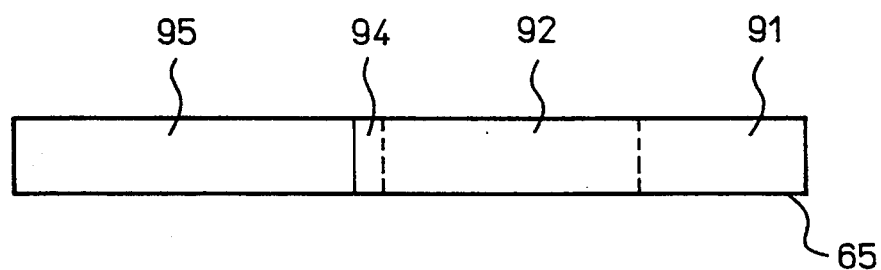

When there is a queue tag associated with the data transfer, FIG. 5 shows the format of nexus pointer 65. The five low order bits 91 are all set at zero because each entry in table 61 includes thirty-two bytes. The next six bits 92 of nexus pointer 65 are a queue tag identifying the queue tag for the data transaction. A bit 94 of nexus pointer 65 is at one indicating that nexus pointer 65 is addressing an entry in portion 63 of nexus table 61. Bits 95 of nexus pointer 65 are set to point to the location of nexus table 61 in memory within initiator 11. The target number and the logic number are not used. When placing entries with queue tags in nexus table 61, initiator 11 chooses unique queue tags. This allows the data transactions to be accessed without using target numbers and logic unit numbers. This arrangement, however, limits the number of concurrent data transactions using queue tags to sixty-four. Practically, this is not a significant limitation.

FIG. 6 shows an alternate embodiment of a nexus table 71 within an initiator which is connected to a SCSI bus which supports up to fifteen targets. Each target may have up to eight logic units and each logic unit supports up to 128 queue tags.

Data transactions which have no queue tags are identified using just a target number and a logic unit number. Entries for data transactions in progress which are addressed using just a target number and a logic unit number are stored in a first portion 72 of nexus table 71. Entries for data transactions which are identified using target numbers, logic numbers and queue tags are stored in a second portion 73 of nexus table 71.

Each entry in nexus table 71 is sixteen bytes and includes a pointer into data transfer scripts 74. Data transfer scripts 74 includes scripted code which control data transfers between an initiator and targets on a SCSI bus.

Figure 7:
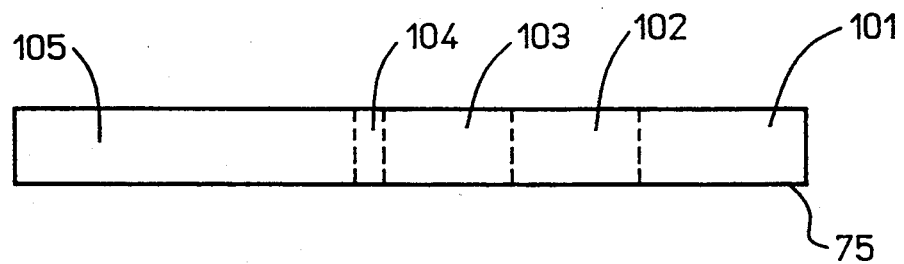
FIG. 7 and FIG. 8 show bit formats of an index used to access the nexus table shown in FIG. 3 in accordance with the alternate preferred embodiment of the present invention.

For transfers which are suspended, initiator 11 places an entry in nexus table 71. During reselection, initiator 11, accesses nexus table 71 with an index (nexus pointer) 75 in order to continue the suspended data transfer. When there is no queue tag associated with the data transfer, FIG. 7 shows the format of nexus pointer 75. The four low order bits 101 are all set at zero. This is because each entry in table 71 includes sixteen bytes. The next three bits 102 of nexus pointer 75 are a target number which identifies the target for the data transaction. The next four bits 103 of nexus pointer 75 are a logic unit number identifying the logic unit for the data transaction. A bit 104 of nexus pointer 75 is at zero indicating that nexus pointer 75 is addressing an entry in portion 72 of nexus table 71. Bits 105 of nexus pointer 75 are set to point to the location of nexus table 71 in memory within initiator 11.

Figure 8:
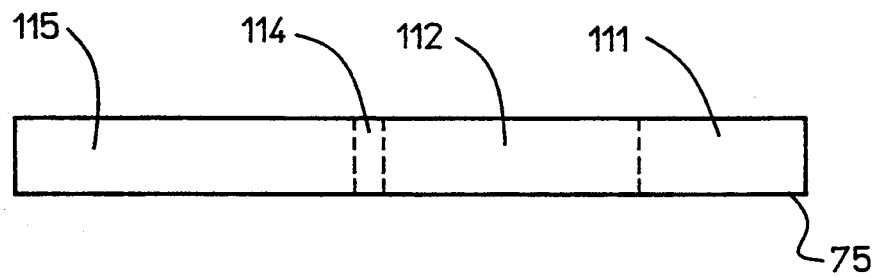

When there is a queue tag associated with the data transfer, FIG. 8 shows the format of nexus pointer 75. The four low order bits 111 are all set at zero because each entry in table 71 includes sixteen bytes. The next seven bits 112 of nexus pointer 75 are a queue tag identifying the queue tag for the data transaction. A bit 114 of nexus pointer 75 is at one indicating that nexus pointer 75 is addressing an entry in portion 73 of nexus table 71. Bits 115 of nexus pointer 75 are set to point to the location of nexus table 71 in memory within initiator 11. The target number and the logic number are not used. When placing entries with queue tags in nexus table 71, initiator 11 chooses unique queue tags. This allows the data transactions to be accessed without using target numbers and logic unit numbers. This arrangement, however, limits the number of concurrent data transactions using queue tags to one hundred twenty-eight.

In FIG. 6, first portion 72 of nexus table 71 and second portion 73 of nexus table 71 are shown contiguously placed in memory to form a single nexus table. Alternately, each of first portion 72 and second portion 73 of nexus table 71 may be placed in separate locations in memory, essentially forming two separate tables. In this case, the table formed by first portion 72 would be indexed by a nexus table pointer configured in accordance with the configuration shown in FIG. 7. The table formed by second portion 73 would be indexed by a nexus table pointer configured in accordance with the configuration shown in FIG. 8.

One advantage of using two separate tables is that the size of each table can be independently varied. For example, the number of entries of the table formed by second portion 73 could be doubled in size to accommodate the storing of a full 256 queue tags. In this case, the configuration of the nexus pointer shown in FIG. 8 would be modified, for example, by increasing the number of bits 112 to eight. In order to do this, for example, the number of low order bits 111 could be reduced to three, thus shrinking the size of each table entry to eight bytes. Alternately, the size of the memory used by table portion 73 could be doubled.

FIG. 9 shows how initiator 11 places an entry into nexus table 61 shown in FIG. 3. In a programming step 121, initiator 11 determines whether a data transaction needs a queue tag. For further information on this determination, see American National Standard X3T9.2/375R Revision 10d (SCSI-2), cited above. If the data transaction does not require a queue tag, in a step 124, an entry for the data transaction is assigned a location in first portion 62 of nexus table 61. The nexus pointer 65 used to place the entry is constructed using the target number and logic unit for the data transfer, according to the format shown in FIG. 4. Prior to initiating the data transaction, a pointer is placed in the entry which points to the location in data transfer scripts 64 which contains code which is to be executed when the data transaction is resumed.

If the data transaction does require a queue tag, in a step 122, a currently unused queue tag is assigned to the data transaction. In a step 123, an entry for the data transaction is assigned a location in second portion 63 of nexus table 61. The index used to place the entry (nexus pointer 65) is constructed using the queue tag number for the data transfer, according to the format shown in FIG. 5. Prior to initiating the data transaction a pointer is placed in the entry which points to the location in data transfer scripts 64 which contains code which is to be executed when the data transaction is resumed.

While the above discussion particularly discusses placing an entry in nexus table 61, the method is equally applicable for placing an entry into nexus table 71 shown in FIG. 6. For example, for nexus table 71, if in programming step 121, it is determined that the data transaction does not require a queue tag, in step 124, an entry for the data transaction is assigned a location in first portion 72 of nexus table 71. The index used to place the entry (nexus pointer 75) is constructed using the target number and logic unit for the data transfer, according to the format shown in FIG. 7. A pointer is placed in the entry which points to the location in data transfer scripts 74 which contains code which is to be executed when the data transaction is resumed.

In step 123, an entry for the data transaction is assigned a location in second portion 73 of nexus table 71. The index (nexus pointer 75) used to place the entry is constructed using the queue tag number for the data transfer, according to the format shown in FIG. 8. A pointer is placed in the entry which points to the location in data transfer scripts 74 which contains code which is to be executed when the data transaction is resumed.

Figure 10:
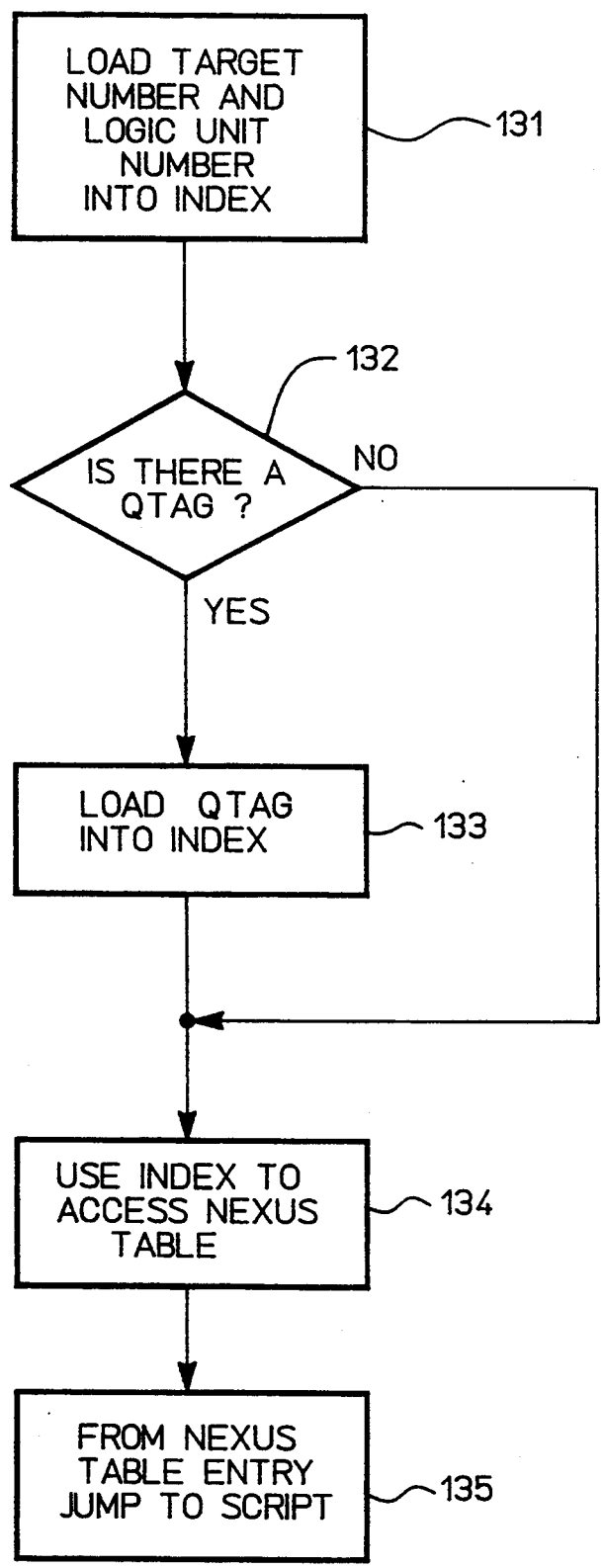
FIG. 10 is a flowchart which shows how a data transaction is located in the nexus table shown in FIG. 3 or the nexus table shown in FIG. 6 in accordance with the preferred embodiment of the present invention.

FIG. 10 shows how initiator 11 accesses an entry from nexus table 61 shown in FIG. 3. When a data transaction is resumed, initiator 11 receives from the target renewing the data transaction a target number and a logic unit number for the data transaction. In a step 131, the target number and logic unit number are loaded into index 65 in the format shown in FIG. 4. Also, bit 84 of index 65 is reset to 0.

For data transactions where there is a queue tag, the target sends a queue tag as part of a message format. In a step 132, initiator 11 checks for the existence of a queue tag. If a queue tag is present, in a step 133, the queue tag is loaded into index 65 in the format shown in FIG. 5. The target number and the logic unit number are overwritten. Also, bit 94 of index 65 is set to 1.

In a step 134, the index is used to access an entry in nexus table 65. In a step 134, the pointer used in the entry is used to access a code location in data scripts 64.

While the above discussion particularly discusses placing an entry in nexus table 61, the method is equally applicable for accessing an entry in nexus table 71 shown in FIG. 6. For example, when accessing nexus table 71, in step 131, the target number and logic unit number are loaded into index 75 in the format shown in FIG. 7. Bit 104 of index 65 is reset to 0. In step 132, initiator 11 checks for the existence of a queue tag. If a queue tag is present, in a step 133, the queue tag is loaded into index 75 in the format shown in FIG. 8. The target number and the logic unit number are overwritten. Also, bit 114 of index 65 is set to 1. In step 134, the index is used to access an entry in nexus table 75. In step 134, the pointer used in the entry is used to access a code location in data scripts 74.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A computing system having a plurality of devices connected to a bus, data transactions between the plurality of devices being identified using a target number and a logic unit number and being optionally additionally identified using a queue tag, a first device of the plurality of devices comprising:

data scripts which include code which script data transactions for the first device;

processor means, coupled to the data scripts, for executing the data scripts; and, a nexus table which stores entries for suspended data transactions, each entry pointing to a location within the data scripts, the nexus table including:

a first table portion in which are stored entries which are for suspended data transactions which are identified using a target number and a logic unit number and which are not additionally identified using a queue tag, the entries within the first table portion being indexed using the target number and the logic unit number, and a second table portion, in a different section of the nexus table than the first table portion, in which are stored entries which are for suspended data transactions which are identified using a target number, a logic unit number and a queue tag, the entries within the second table portion being indexed using the queue tag but not using the target number and the logic unit number.

2. A computing system as in claim 1 wherein the bus operates in accordance to the ANSI SCSI standard.

* * * * *